US009853926B2

United States Patent
Tussy

(10) Patent No.: US 9,853,926 B2
(45) Date of Patent: Dec. 26, 2017

(54) METHODS AND SYSTEMS FOR EXCHANGING PRIVATE MESSAGES

(71) Applicant: Kevin Alan Tussy, Las Vegas, NV (US)

(72) Inventor: Kevin Alan Tussy, Las Vegas, NV (US)

(*) Notice: Subject to any disclaimer, the term of this patent is extended or adjusted under 35 U.S.C. 154(b) by 196 days.

(21) Appl. No.: 14/745,163

(22) Filed: Jun. 19, 2015

(65) Prior Publication Data

US 2015/0373021 A1 Dec. 24, 2015

Related U.S. Application Data

(60) Provisional application No. 62/014,640, filed on Jun. 19, 2014, provisional application No. 62/073,340, filed on Oct. 31, 2014.

(51) Int. Cl.
*H04L 12/58* (2006.01)
*H04L 29/06* (2006.01)

(52) U.S. Cl.
CPC ........ *H04L 51/066* (2013.01); *H04L 63/0428* (2013.01)

(58) Field of Classification Search
CPC .......................... H04L 51/066; H04L 63/0428
See application file for complete search history.

(56) References Cited

U.S. PATENT DOCUMENTS 7,296,156 B2 11/2007 Marmigere et al.
9,160,695 B2 * 10/2015 Kadashevich .......... H04L 51/08

2003/0055907 A1 * 3/2003 Stiers .................. H04L 67/2804
709/206
2003/0185398 A1 10/2003 Hypponnen
2005/0210246 A1 * 9/2005 Faure .................... H04L 12/583
713/167
2008/0220747 A1 9/2008 Ashkenzai et al.
2009/0305673 A1 12/2009 Mardikar (Continued)

FOREIGN PATENT DOCUMENTS

EP 1569482 8/2005
WO WO0135685 5/2001

OTHER PUBLICATIONS

Snapchat—Wikipedia, the free encyclopedia, https://en.wikipedia.org/wiki/Snapchat, 10 pages.

(Continued)

*Primary Examiner* — Beemnet Dada
(74) *Attorney, Agent, or Firm* — Weide & Miller, Ltd.

(57) ABSTRACT

A method and server are provided for sending a secure message from a first computing device to a second computing device. A first computing device sends an encrypted, secure message a message server. The message server processes the secure message to unencrypt and separate the secure message contents into two or more separately downloadable message parts. The server sends a complex link to the second computing device, or sends a complex link to the first computing device for sending to the second computing device. When the complex link is selected by a user of the second computing device the server transmits a first part of the message to the second computing device. After transmitting the first part, the server then separately transmits a second part of the message to the second computing device.

18 Claims, 10 Drawing Sheets

(56) References Cited

U.S. PATENT DOCUMENTS

2010/0057466 A1 3/2010 Garg et al.
2014/0136390 A1* 5/2014 Schwarz ............... G06Q 40/04
                                                              705/37

OTHER PUBLICATIONS

Graham Cluely, "Does Snapchat offer safe sexting from smartphones, or a false sense of security?", Naked Security by Sophos, https://nakedsecurity.sophos.com/2012/11/06/snapchat-sexting-app-security, Nov. 6, 2012, 15 pages.
Laurie Segall, "Snapchat's 'disappearing' videos don't actually vanish", CNN Money US, http://money.cnn.com/2012/12/28/technology/security/snapchat-security-flaw/, Dec. 28, 2012, 3 pages.

* cited by examiner

METHODS AND SYSTEMS FOR EXCHANGING PRIVATE MESSAGES

CROSS REFERENCE TO RELATED APPLICATION

This application claims priority to U.S. Provisional Application No. 62/014,640 which was filed on Jun. 19, 2014 and U.S. Provisional Application No. 62/073,340 which was filed on Oct. 31, 2014. The above applications are hereby incorporated in their entirety by reference.

BACKGROUND

1. Field of the Invention

The disclosed embodiments relate to a method and apparatus for messaging and in particular to a private messaging system.

2. Related Art

In many instances it may desirable for an individual to confidentially provide information to a third party or to provide a message to a third party. The confidentiality may relate to financial data, personal information, passwords, photos, videos, or any other private message. While existing messaging systems may seem private to users, in reality, these existing methods for communication are not private.

In the case of email, it is well known that this message is not entirely private because the sent message remains on the sender's computer and also remains on the machine of the message recipient. This allows anyone to view the message simply by viewing the sender or recipient's machine (inbox or outbox) or by a hacker gaining illegal access to the machine to view the message. In addition, a copy of the message may be stored on an exchange server, and therefore may be obtained from the exchange server. Furthermore, the sender of the message is revealed to the recipient, thereby preventing the message sender from being anonymous, and the text is also viewable. SMS or text messages suffer from many of the same drawbacks because such messages remain on the mobile phone of the sender and recipient.

Traditional voice calls may be used to communicate, but the sender or caller must talk out loud, thereby allowing others around them to hear the message who may then remember and/or write down the content. If the message is personal or highly confidential, speaking the information out loud is not desirable. In addition, for many messages, it is not possible or desirable to speak to the other person when the message needs to be sent.

SUMMARY

To overcome the drawbacks of the prior art, the disclosed embodiments have been developed and include a method and apparatus for sending and receiving private messages. According to one embodiment, a method is provided for sending a secure message from a first computing device to a second computing device. A first computing device sends an encrypted, secure message a message server. The message server processes the secure message to unencrypt and separate the secure message contents into two or more separately downloadable message parts. The server sends a complex link to the second computing device, or sends a complex link to the first computing device for sending to the second computing device. When the complex link is selected by a user of the second computing device the server transmits a first part of the message to the second computing device. After transmitting the first part, the server then separately transmits a second part of the message to the second computing device.

According to some embodiments, the second part of the message is configured to overwrite the first part of the message on the second computing device. Further, the server may transmit a blank message part after transmitting all parts of the secure message. The blank message part is configured to overwrite the last downloaded message part.

The complex link may instruct the second computing device to open a secure window of a web browser on the second computing device. The downloadable message parts may be downloaded via the secure window of the web browser. In further embodiments, the user of the second computing device may be presented with an option to initiate a secure chat in the secure window of the web browser to respond to the secure message.

According to other embodiments, a server for sending secure messages is provided. The server may include a processor, one or more transceivers configured to send and receive information through one or more networks, and one or more memories including a non-transitory, computer-readable storage medium. The memories may include machine readable instructions, which when executed by the processor, configure the server to receive an encrypted message from a first computing device. The encrypted message may be a secure message and may include address information of a second computing device. The server processes the encrypted message to unencrypt the encrypted message and to separate the message into two or more downloadable message parts.

The server may generate a unique link to access the downloadable message parts and transmit the unique link to the first computing device for sending to the second computing device. In response to the selection of the unique link on the second computing device, the server may transmit a first message part to the second computing device. After transmitting the first message part; the server may then transmit a second message part of to the second computing device.

In some embodiments, the server may transmit the second message part to the second computing device at a predetermined time after transmitting the first message part. The server may store the message parts for a predetermined time period and may delete the message parts after the predetermined time period. In other embodiments, the server stores the message parts until the downloadable message parts have been accessed a predetermined number of times. In some embodiments, the server is configured to host a secure chat between the first computing the device and the second computing device.

In further embodiments, the downloadable message parts comprise image files. In some instances, the server may configure a width of the image files to be greater than a resolution width of a screen of the second computing device such that only a portion of the downloadable message is viewable on the screen.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
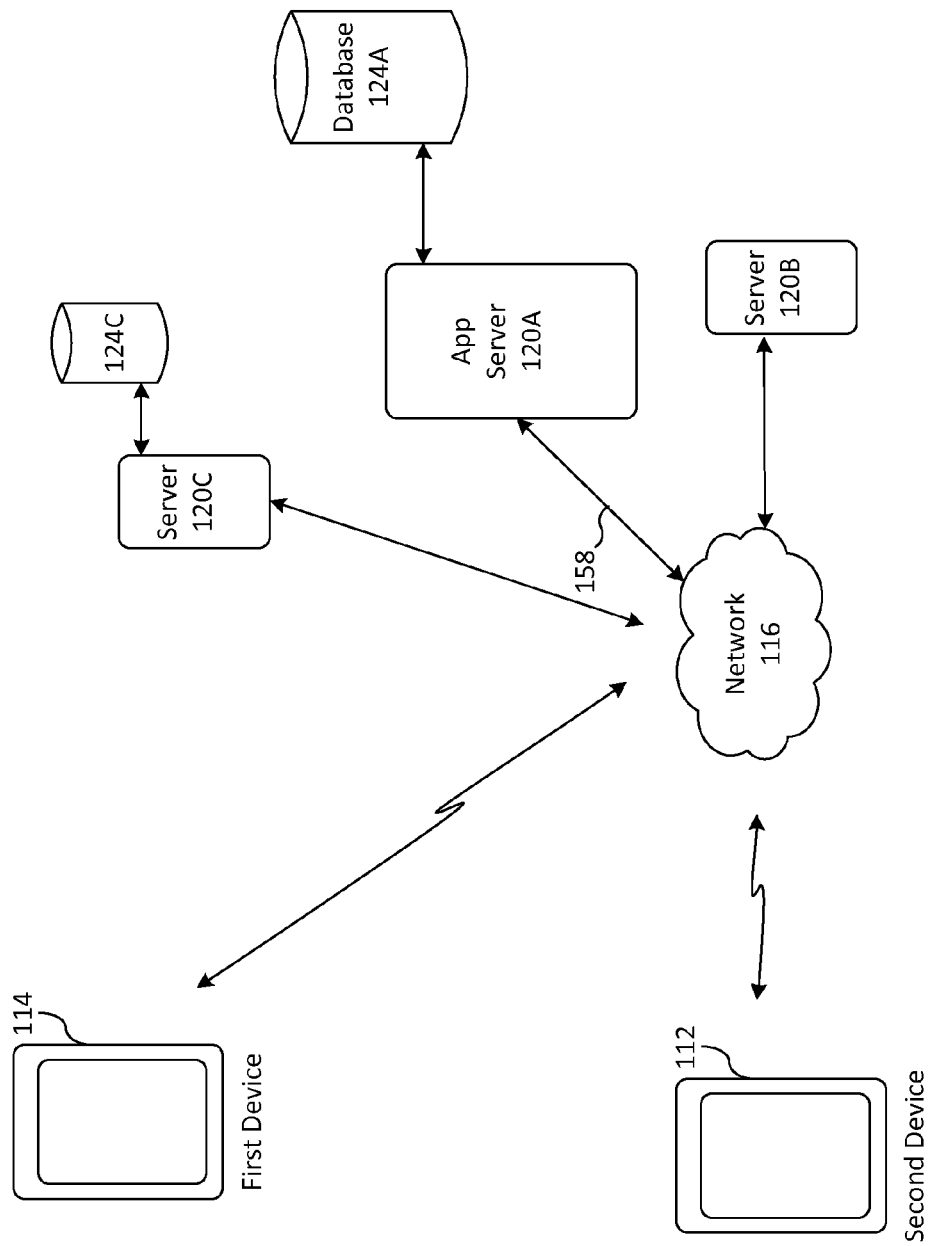
FIG. 1 is a block diagram of an example environment of operation.

FIG. 1 illustrates an example system for private messaging as described herein. This is but one possible environment of use and system. It is contemplated that, after reading the specification provided below in connection with the figures, one of ordinary skill in the art may arrive at different environments of use and configurations. In the following description, a user of the system may refer to the person or entity that would like to send a message to a third party.

The user has a mobile device 112 that is configured to execute software code and communicate over a network 116. The user may use the mobile device 112 to send a message to a message recipient having a mobile device 114. The mobile device 112 may comprise any type of mobile device no known or later developed, such as a phone, Ipod type device, watch, or tablet computer. A fixed device may also be sued The mobile device 112 may be capable of capturing an image, either still or video, performing processing of the image, and communicating over a network 116. The mobile device 112 could also be a fixed computing device such as a desk top computer. The mobile device 112 is described below in greater detail.

It is contemplated that the user may install software on the device 112 such that the device 112 and software provide the functionality described herein. The devices 112 and 114 may relay communications to and through the network 116. For example, the devices 112, 114 are configured to wirelessly (or over wires) communicate over a network 116 with a remote server 120, such as an app (application) server 120A. The server 120 may communicate with one or more optional databases 124.

The network 116 may be any type network capable of communicating data to and from the mobile devices 112, 114. The servers 120 may include one or more processors, memories, and transceivers configured to communicate with the mobile devices 112, 114. The servers 120 and devices 112, 114 are configured with a processor or memory and configured to execute machine readable code or machine instructions stored in the memory.

The optional databases 124 may contain user account information that identify the user and associated data about the user. Because the messaging system is private, it is contemplated that the messages are not stored on the databases 124. Likewise, when a message is sent, information or data identifying which users have sent messages, and to whom messages were sent may not be stored to maintain the private nature of the communication.

In this embodiment, the servers 120 process requests from device 112 for sending a message from the device 112 to device 114. The servers 120 process the requests as described on connection with FIGS. 3A and 3B.

The servers 120 may include in addition to the application server 120A a second server 120B with an optional associated second database 124B, and a third server 120C with an associated third database 124C. The second and third servers 120B, 120C may be provided to contain additional communication paths that are not available on the server 120A.

For example, one of the additional servers 120B, 120C may be used as a backup, or the communication may randomly occur through one of the different servers 120A, 120B, and 120C. Or, the message may be dispersed to different servers 120A, 120B, 120C, and different parts or portions of the message may be sent through different servers 120A, 120B, 120C so that no one message or message portion travels through the same server.

One of the other servers 120B, 120C and databases 124B, 124C may be for users to update their personal information. For example, it is contemplated that a user of the system may keep records which include information about the user or may store the user's address list.

Executing on the mobile device 112 is one or more software applications. This software is referred to herein as a messaging application (app). The messaging application (app) operates as described in FIGS. 3A and 3B.

Figure 2:
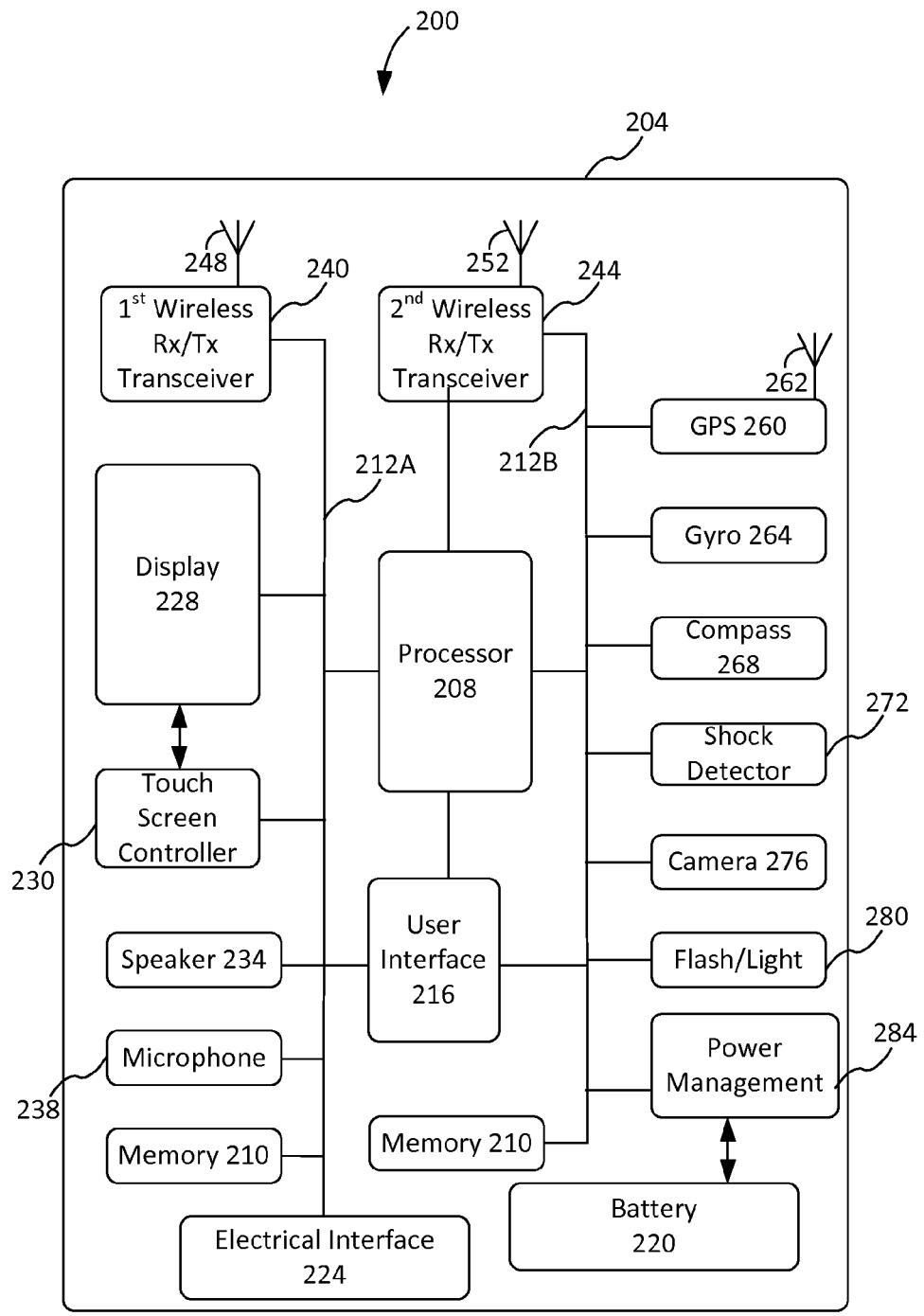
FIG. 2 is a block diagram of an example embodiment of a mobile device.

FIG. 2 illustrates an example embodiment of a device 200, such as the mobile device 112, 114. This is but one possible device configuration and as such it is contemplated that one of ordinary skill in the art may differently configure the mobile device. The device 200 may comprise any type of fixed or mobile communication device that can be configured in such a way so as to function as described below. The mobile device may comprise a PDA, cellular telephone, smart phone, tablet PC, wireless electronic pad, or any other computing device.

In this example embodiment, the mobile device 200 is configured with an outer housing 204 that protects and contains the components described below. Within the housing 204 is a processor 208 and a first and second bus 212A, 212B (collectively 212). The processor 208 communicates over the buses 212 with the other components of the mobile device 200. The processor 208 may comprise any type of processor or controller capable of performing as described herein. The processor 208 may comprise a general purpose processor, ASIC, ARM, DSP, controller, or any other type processing device.

The processor 208 and other elements of the mobile device 200 receive power from a battery 220 or other power source. An electrical interface 224 provides one or more electrical ports to electrically interface with the mobile device 200, such as with a second electronic device, computer, a medical device, or a power supply/charging device. The interface 224 may comprise any type of electrical interface or connector format.

One or more memories 210 are part of the mobile device 200 for storage of machine readable code for execution on the processor 208, and for storage of data, such as image data, audio data, user data, medical data, location data, shock data, or any other type of data. The memory may store the messaging application (app). The memory may comprise RAM, ROM, flash memory, optical memory, or micro-drive memory. The machine readable code as described herein is non-transitory.

As part of this embodiment, the processor 208 connects to a user interface 216. The user interface 216 may comprise any system or device configured to accept user input to control the mobile device. The user interface 216 may comprise one or more of the following: keyboard, roller ball, buttons, wheels, pointer key, touch pad, and touch screen. A touch screen controller 230 is also provided which interfaces through the bus 212 and connects to a display 228.

The display comprises any type of display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 228 receives signals from the processor 208 and these signals are translated by the display into text and images as is understood in the art. The display 228 may further comprise a display processor (not shown) or controller that interfaces with the processor 208. The touch screen controller 230 may comprise a module configured to receive signals from a touch screen which is overlaid on the display 228. Messages may be entered on the touch screen 230, or the user interface 216 may include a keyboard or other data entry device.

Also part of this exemplary mobile device is a speaker 234 and microphone 238. The speaker 234 and microphone 238 may be controlled by the processor 208 and are configured to receive and convert audio signals to electrical signals, in the case of the microphone, based on processor control. Likewise, processor 208 may activate the speaker 234 to generate audio signals. These devices operate as is understood in the art and as such are not described in detail herein.

Also connected to one or more of the buses 212 is a first wireless transceiver 240 and a second wireless transceiver 244, each of which connect to respective antenna 248, 252. The first and second transceiver 240, 244 are configured to receive incoming signals from a remote transmitter and perform analog front end processing on the signals to generate analog baseband signals. The incoming signal may be further processed by conversion to a digital format, such as by an analog to digital converter, for subsequent processing by the processor 208. Likewise, the first and second transceiver 240, 244 are configured to receive outgoing signals from the processor 208, or another component of the mobile device 208, and up convert these signal from baseband to RF frequency for transmission over the respective antenna 248, 252. Although shown with a first wireless transceiver 240 and a second wireless transceiver 244, it is contemplated that the mobile device 200 may have only one such system or two or more transceivers. For example, some devices are tri-band or quad-band capable, or have Bluetooth and NFC communication capability.

It is contemplated that the mobile device, and hence the first wireless transceiver 240 and a second wireless transceiver 244 may be configured to operate according to any presently existing or future developed wireless standard including, but not limited to, Bluetooth, WI-FI such as IEEE 802.11a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 212B which also interface with the processor 208. These devices include a global positioning system (GPS) module 260 with associated antenna 262. The GPS module 260 is capable of receiving and processing signals from satellites or other transponders to generate location data regarding the location, direction of travel, and speed of the GPS module 260. GPS is generally understood in the art and hence not described in detail herein.

A gyro 264 connects to the bus 212B to generate and provide orientation data regarding the orientation of the mobile device 204. A compass 268, such as a magnetometer, is provided to provide directional information to the mobile device 204. A shock detector 272, which may include an accelerometer, connects to the bus 212B to provide information or data regarding shocks or forces experienced by the mobile device. In one configuration, the shock detector 272 generates and provides data to the processor 208 when the mobile device experiences a shock or force greater than a predetermined threshold. This may indicate a fall or accident.

One or more cameras (still, video, or both) 276 are provided to capture image data for storage in the memory 210 and/or for possible transmission over a wireless or wired link or for viewing at a later time. The processor 208 may process image data to perform image recognition, such as in the case of, facial detection, item detection, facial recognition, item recognition, or bar/box code reading.

A flasher and/or flashlight 280 are provided and are processor controllable. The flasher or flashlight 280 may serve as a strobe or traditional flashlight, and may include an LED. A power management module 284 interfaces with or monitors the battery 220 to manage power consumption, control battery charging, and provide supply voltages to the various devices which may require different power requirements.

Figure 3A:
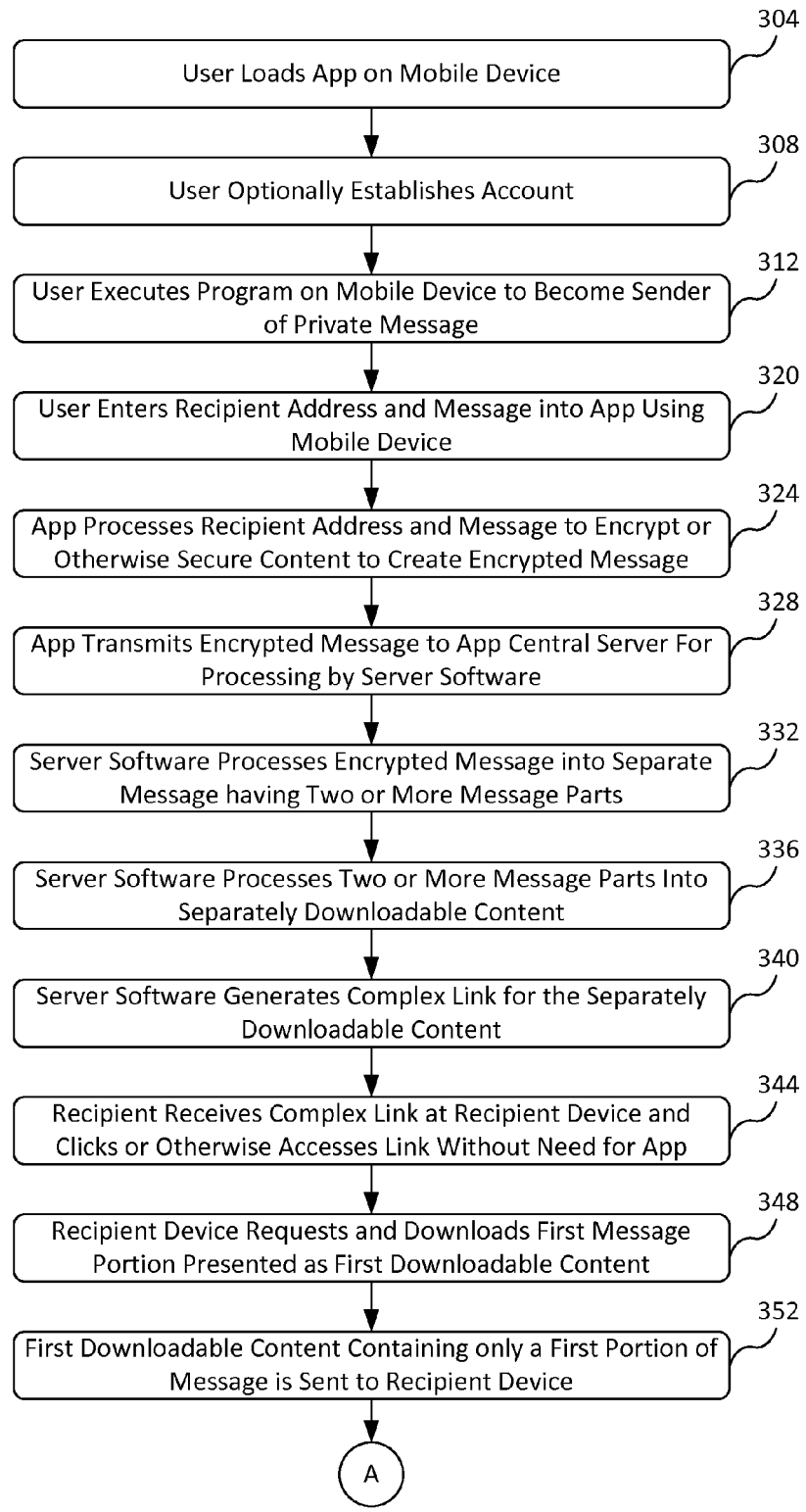
FIGS. 3A and 3B are an operational flow diagram of an example method of operation.
Figure 3B:
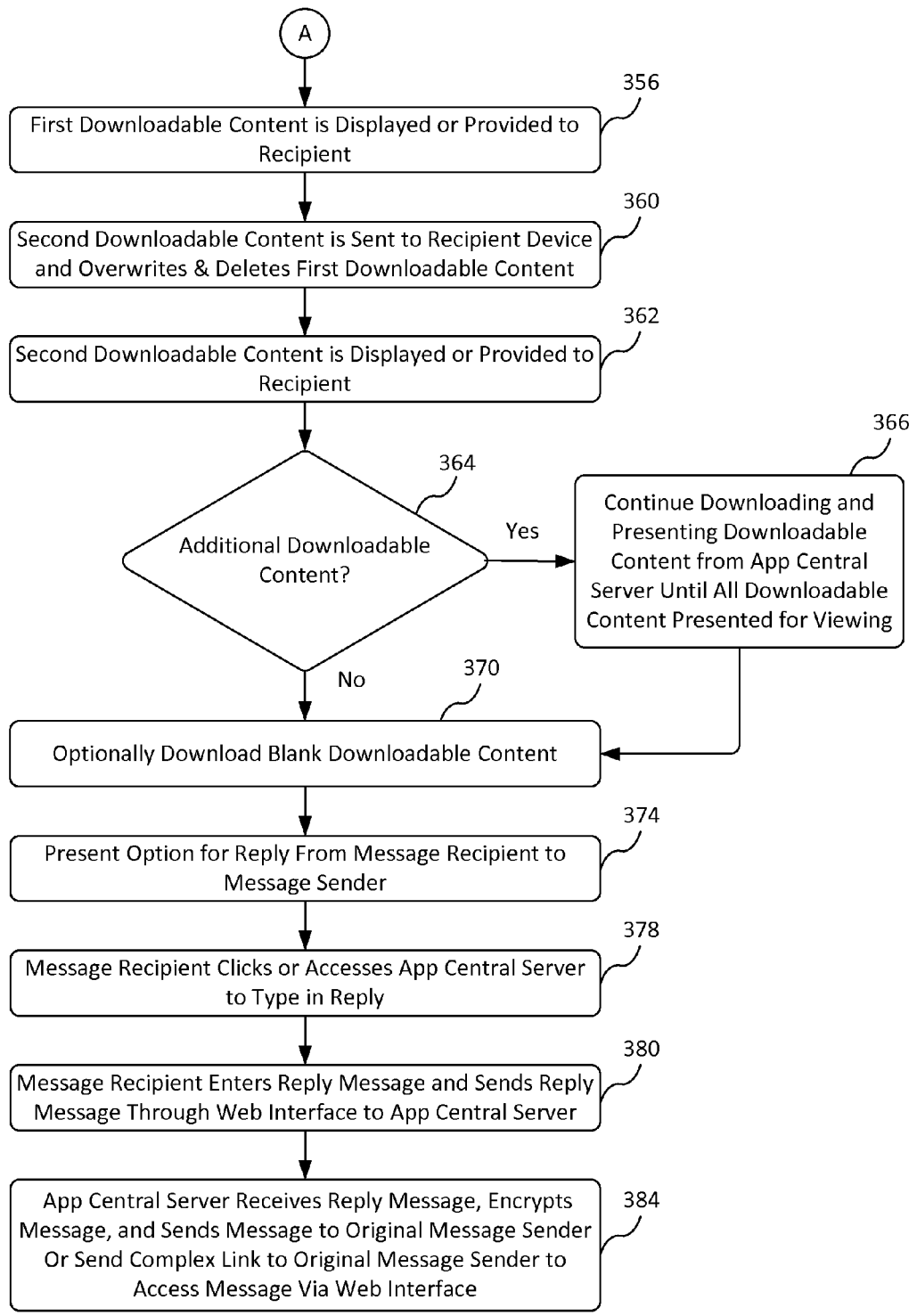

FIGS. 3A and 3B is an operational flow diagram of an example method of operation. This is but one possible method of operation and as such, it is contemplated that other methods of operation may be provided. In other embodiments other steps may be added to the process, or some of the listed steps may be skipped.

In this embodiment, at a step 304, the user loads the messaging application on their device, such as a mobile device. In this method of operation, only the message sender, and not the party receiving or replying to the original message must have the messaging application on their sender device. In other embodiments, the messaging application may run as a program within a web browser or an online application.

At a step 308, the user optionally establishes an account with a server associated with the messaging application. Then, at a step 312, the user executes the messaging application program to send private messages. At a step 320, the user enters the recipient address and the message, such as in text form, which is to be sent to the message recipient. The recipient address may be a phone number, email address, or any other type number, text, or identifier.

At a step 324, the app processes the recipient address and the message to encrypt or otherwise secure the content to create an encrypted message. This step causes the message to be encrypted or non-readable as it is sent from the sender's device to the application server. Any type of encryption may be used. Thus, in this example embodiment, once the message leaves the sender's device, it is encrypted and secure. It is contemplated that after step 324 the operation could advance, in an alternative embodiment, to step 348 such that direct communication occurs from device to device without use of a central server or server software. In this case, the communication would occur from mobile device to mobile device. Encryption may occur or the text may be unencrypted At a step 328 the server sends the encrypted message and address (phone number or email) for the recipient to the app central server for processing by the server software. At a step 332 the server software at the app server processes the encrypted message into separate message parts which are not encrypted. This may include processing the message into two or more message parts. The message may be separated in any manner, but in one embodiment the message is separated into at least two parts or blocks. In one embodiment, numbers greater than two digits are separated into separate portions. The message may be separated into any number of different sections. In one embodiment the message is divided such that each word is a separate part. In another embodiment, every two words form a message part. Word messages may be divided into individuals or groups of individual characters. Numbers may be changes to text.

Next, at a step 336, the server processes the two or more message parts into separately downloadable content. The content may be in an image format, such as JPEG or GIF format, or in a text format. Then, at a step 340, the server software generates complex links for the downloadable content. The term complex indicates that they are not sequential or otherwise identify the sender or recipient. The term complex indicates that the link may not be guessed, determined, or calculated by a third party. In one embodiment, the complex link may include a random number of multiple digits. In one embodiment the number is greater than 10 digits. In one embodiment, a single link is generated for the multiple items of downloadable content, each of which represents a portion of the original entire message. In another embodiment, a separate link is generated for each portion of the message. In either embodiment, subsequent portions of the message, contained in the downloadable content, are provided to the user either automatically, or after user input.

In one configuration, the link to at least one portion of the message causes a subsequent downloadable content to be retrieved from the application server. At a step 344, the recipient receives the complex link to at least one part of the downloadable content. The link is complex because it contains a long alpha, numeric, or both, identifier in the link that is unique to the message or downloadable content. In one embodiment, this identifier is a randomly generated one hundred character string. This complex link prevents a hacker or other party from predicting or guessing the link address to intercept and view the message or more than one part of the message. Even if one link is guessed or obtained, it would not be possible to determine another link in the message chain. It is very unlikely that a third party could accurately guess the one hundred character link identifier and then a second random one hundred character link identifier. The link identifier is established as part of the link.

At a step 348, the recipient device requests the message, such as by clicking or tapping on the link to download the first message portion presented as a first downloadable content. Then, at a step 352, responsive to the request, the first downloadable content containing only a first portion of the message is sent to the recipient device. The first downloadable content may be sent via a network, such as the Internet.

Turning now to FIG. 3B, at a step 356, the first downloadable content is displayed or otherwise presented to the recipient, such as on the screen of the recipient's device. Because the first downloadable content only contains a portion of the message, the recipient cannot see the entire message. At a step 360, the user initiates or the system automatically sends the second downloadable content to the device of the recipient and at the same time overwrites the first downloadable content. Thus, the first downloadable content is no longer stored or cached on the recipient's device. In another embodiment, the server processes one part of the content into a message.gif, such that the viewing page has code in it that tells the browser not to cache the content and tells the page to refresh every 2 seconds with a new .gif from the server. Then the server overwrites the file message.gif, and when the browser is told to refresh by the existing displayed page the new content is shown as a new message.gif. Then the server creates new content for another message.gif and the process repeats. The server can log when a message.gif is accessed by the network and that can be the trigger to create the new block of information to overwrite the existing message.gif. In another embodiment, a code is included in the web page that instructs the browser not to store the content.

At step 362, the second downloadable content is displayed or provided to the recipient so that the recipient receives this portion of the message. By only providing the user a portion of the message at a time, the total message is obscured and cannot be shown in one screenshot. In addition, in certain embodiments and configurations the URL that is displayed in the browser page is not visible in its entirety because of its length. This prevents the entire URL from being seen by the user of the device and prevents screenshots from capturing the entire URL so there can be no definite connection made from the link sent to the recipient to the page displaying the parts of the message. In one embodiment the URL is greater than 15 characters. In one embodiment the URL is greater than 25 characters. In one embodiment the URL is greater than 50 characters. In one embodiment the URL is greater than 100 characters. In addition, in certain embodiments and configurations, the recipient is not able to determine who sent the message. This further secures the message and provides a different level of security, such as by anonymity, to the sender of the message. The URL may only be active for a short period of time, which may be set by the system or set by the sender, recipient, or both.

At a decision step 364, the system determines if additional downloadable content is available for download from the application server. It is further contemplated that the downloadable content (showing only a portion of the message) is only visible on the screen for a short period of time such that the message portions either flash or scroll across the screen. This prevents the recipient or a third party viewer from taking a picture or screen shot of the screen to capture the entire message. This also prevents the entire message from being stored on the recipient device due to the downloaded content being configured to overwrite prior downloaded content. In another embodiment, the entire message is prevented from being stored on the recipient device by the system (user's device or application server) being configured to prevent the downloadable content from being stored on the receiving device.

If at decision step 364 there is additional downloadable content, then the operation advances to step 366 and the process continues to download, overwrite, and display the remaining downloadable content from the application server. This occurs until there is no additional content to be downloaded.

Figure 4:
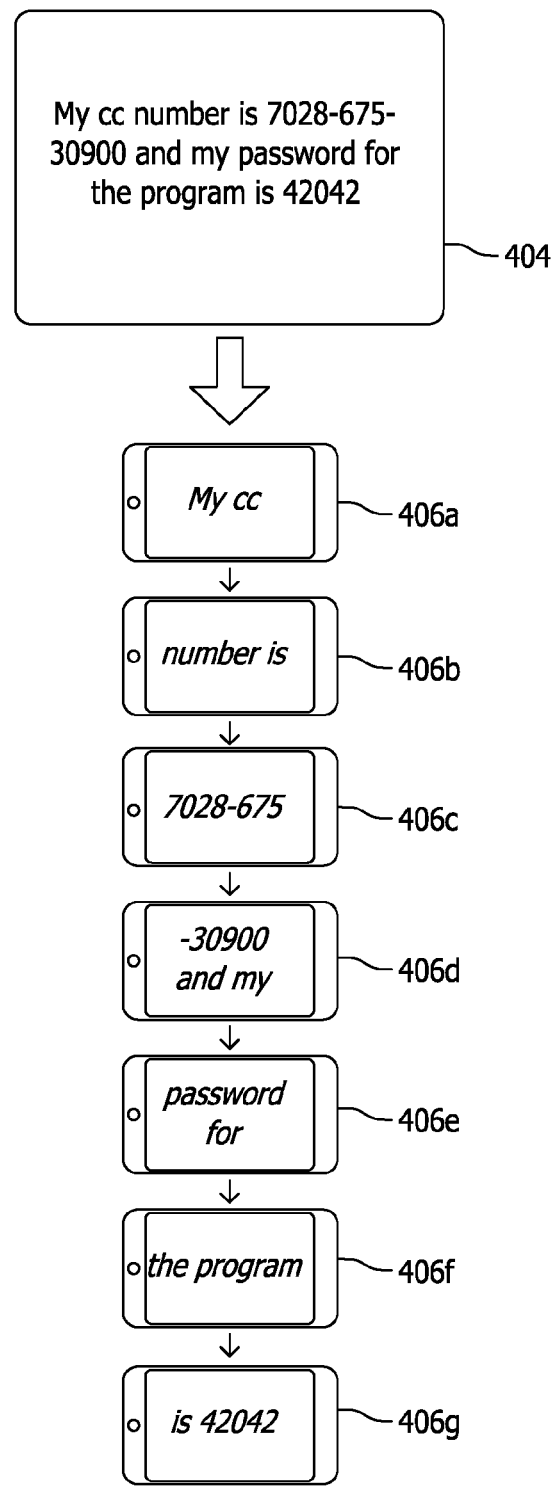
FIG. 4 illustrates exemplary processing of the original message into separate message portions, which are sent as items of downloadable content.

An example of the downloadable content being sequentially displayed or provided to the recipient is shown in FIG. 4. In FIG. 4, an example message 404 that the sender wishes to keep secure includes the sender's credit card number and a password. As explained above, the message is divided into separate downloadable portions that are displayed incrementally to the recipient. Thus, the recipient progressively sees message portions 406a-406g separately, screen by screen, as shown in FIG. 4 The time between each screen shot may be set by the system, users, sender, or recipient. The time could range from less than 1 second to several seconds or longer.

Returning to FIG. 3B, after both of steps 364 and 366, the operation advances to step 370. At step 370, the system may optionally download a blank or empty downloadable content item to overwrite the last portion of the message. Thus, no part of the message or text is stored or cached. In some embodiments, the display window may be automatically closed, so that even the last downloadable content is not displayed beyond the set display time. It is also contemplated that additional downloadable content may then overwrite the last downloadable content with advertising or other promotional information, such as, for example, a banner ad. In another embodiment the recipient must view an advertisement such as a banner ad for the remaining parts of the message to be shown. This insures the ad is viewed while also allowing the service to be offered without a fee to the user due to the ad revenue.

At a step 374, the option for the message recipient to reply to the sender is presented. This may be presented as a clickable or otherwise selectable link which presents a text entry area for the recipient to send a reply. In addition, there may be an option presented to upload a file such as a photo or video. The sender of the photo or video may set parameters for how long the text, photo, or video is available to be viewed. For example, it may be viewable for 20 seconds, 1 minute, 5 minutes, or any other amount of time.

Upon entering the reply message, the recipient may send the reply to the original message sender. This occurs at a step 378 and 380 such that the reply is sent through a web interface to the application server and then to the sender device. It is also contemplated that the screen that displays the reply option may include a field into which the user may immediately type a reply without having to take any further action. This may be a text entry box or field with an associated reply button which may be selected after the reply is entered.

In another embodiment, the sender may set a time for which the recipient must reply after they view the original message, such as 20 seconds, 1 minute, 5 minutes, or any other amount of time. This limits the recipient's time to prepare the response to the sender. If the reply message is not sent within this time period, a reply cannot be sent because the system is configured to not allow a reply. The communication session may thus be terminated. In other embodiment, there is no time limit for a reply.

Then, at a step 384, the application server and the server based application software may execute the same process as described above on the reply message, such as by forming and providing a complex link, or the system may forward the message directly to the sender. In one embodiment, the reply is visible inside the application on the user's phone and the reply may be sent back to the other person without using SMS. In another embodiment, the server may receive the reply message and encrypt the message before sending the reply to the original sender. Because the device of the original sender include the app, the device may unencrypt the message, and the device may display the reply message to the original sender.

Figure 5:
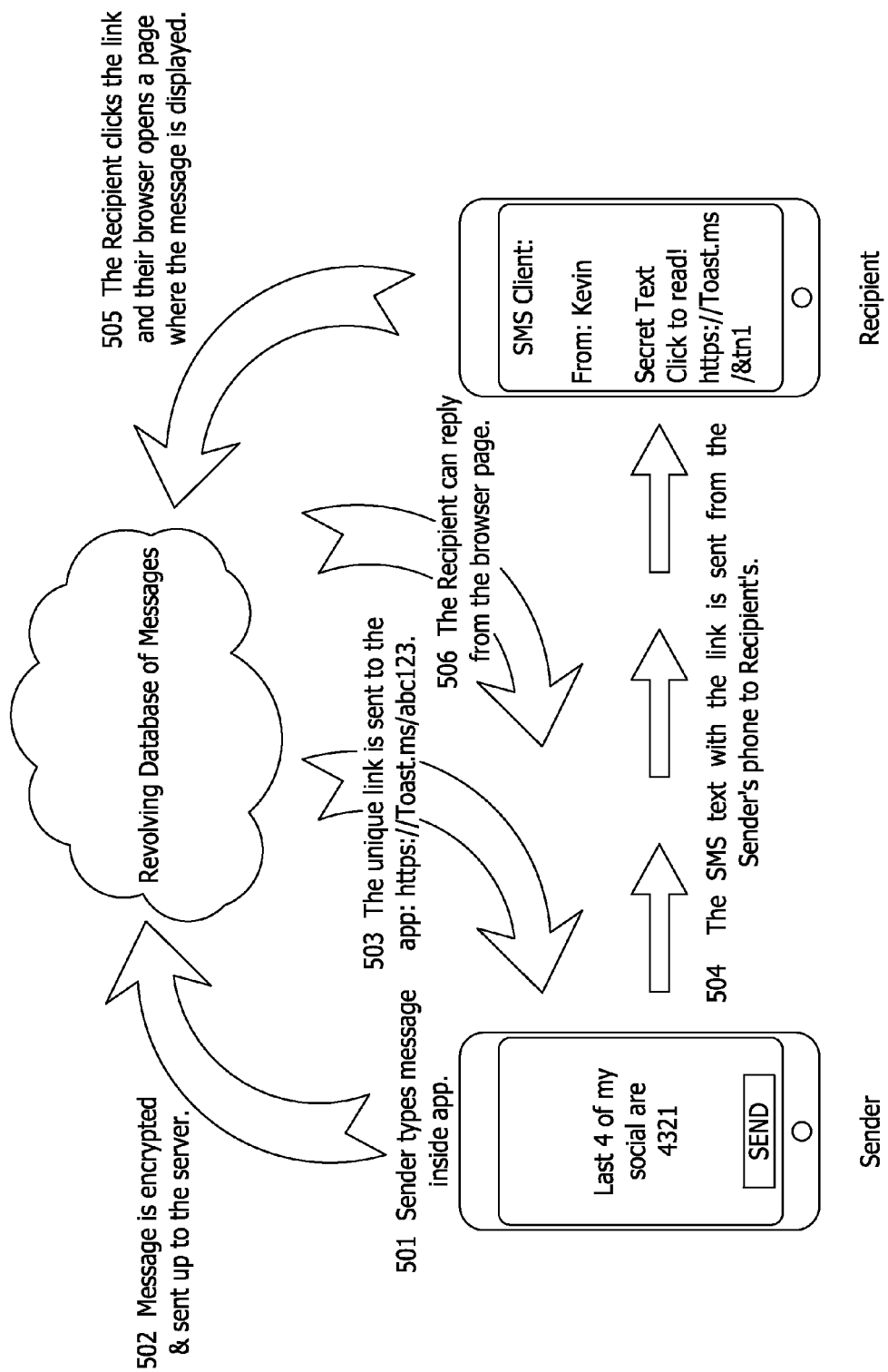
FIG. 5 illustrates a state diagram of an exemplary method of operation and the exchange of messages between the sender and the recipient.

One embodiment of the above described process is succinctly shown in FIG. 5 to further aid in the understanding of the embodiments. In FIG. 5, the sender types a message into his or her device using the provided application in step 501. The message could also be dictated or the message may simply be an image or other attachment. The sender's device encrypts the message and sends the message to the database in step 502. Encryption is optional but preferred. In response, the database generates a unique link or other access feature and sends the unique link back to the sender device in step 503. The unique link could be sent directly to the recipient to avoid direct contact between the sender and the recipient. With the unique link, the sender can send a text message (or any other type of communication including the link) containing the link to the recipient in step 504. The link may stay active until accessed by the recipient, or the link may be active for a limited time. Upon receiving the unique link, the recipient may click on or select the link to view the message in a secure browser (or unsecure browser) or any other window or portal to the line or from the link, in step 505. Lastly, in step 506, the recipient may reply to the message from the browser page accessed by the unique link.

Adaptions and Modifications

In a further embodiment, to continue communication after receiving the secure message, the system may establish a message view page in a browser window, and a browser based chat client to show messages, or exchanges, after the initial reply. This window and interface may also show information such as "the other person is typing a message" while the person is typing in the app or on the page and then the next message can be displayed on the screen when sent. This improves communication exchange. In one embodiment both people participating in the conversation go to separate browser pages that are connected only through the server and only for the time that they are typing messages. As a result, both people would get a link in their SMS client or email box. The session could then be initiated from a website or in the application.

Figure 6A:
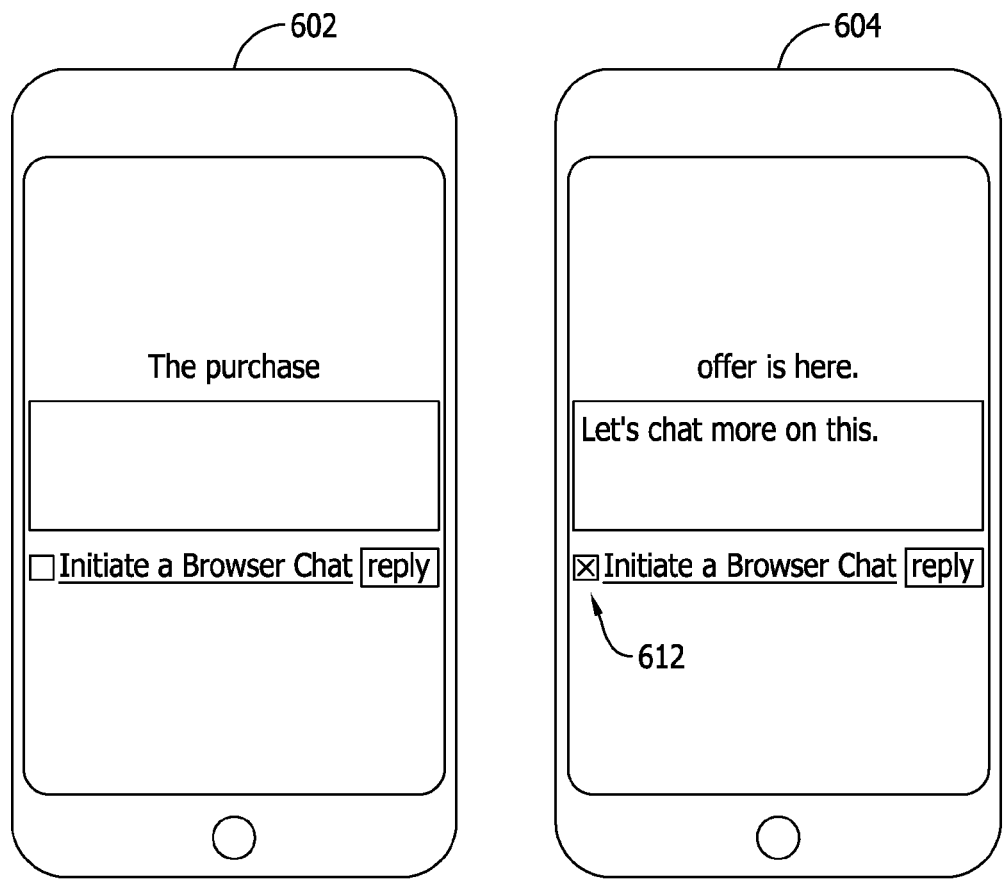
FIGS. 6A and 6B illustrate exemplary browser screens used for messaging.
Figure 6B:
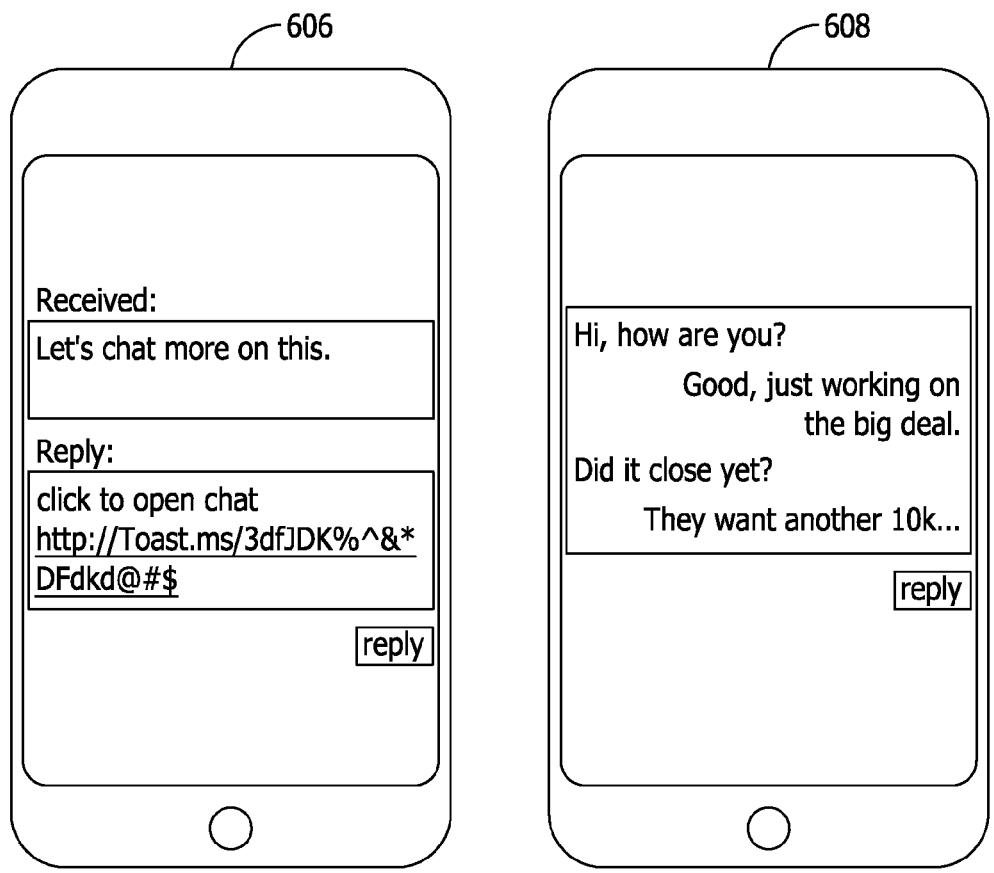

An example of this is shown in FIGS. 6A and 6B. In this embodiment, browser screens 602, 604 showing the secure message incrementally are illustrated in FIG. 6A. In browser screen 604, the recipient selects an option 612 to initiate a secure browser chat in response to the secure message. On the sender's browser screen 606 in FIG. 6B, the sender receives an indication that the recipient has initiated a secure browser chat along with a link to join the chat. The secure browser 608 may then be opened by the sender to join the secure chat to securely communicate further with the recipient. The chat may be encrypted and/or not permanently stored on any memory.

It is also contemplated that the method and apparatus disclosed herein may send a message to more than one telephone number or email address during a message send operation. Then, the message recipients receive the links as described above. The links sent to each recipient could be the same or each link could potentially be different. To reply, each recipient can click the link to access the message. Replies from each recipient may be shared, or only to the sender. This could result in three people in a chat room type scenario, messaging each other at the same time one through the app and two through the browser over secure connections. Then once a person closes the browser, all of their contents of the chat messaging is gone and the link can no longer be accessed. Because each browser window displays only a portion of the message at any given time and the message is not otherwise stored, when a person exits the browser, no further record of the message remains.

In one embodiment, the text is displayed very large so that the user would have to scroll right (or other direction) to see it all but the words couldn't all be on the screen at the same time. This also prevents the entire message from being viewed entirely on the screen at one time. It is also contemplated that after a certain amount of time the first words of the message disappear and words later in the message appear, so the entire message can not be captured with a screen shot of by taking a picture of the screen. The system may detect the resolution and size of a screen of the recipient device, or the size of a window of a web browser of the recipient device in order to configure the text so that all of the words cannot be seen at the same time.

As discussed above, messages may be further privatized by having both the original sender and all reply messages be established through the complex link exchange described above. Likewise, the complex links may be used to establish two private chat windows which the sender and recipient may use to establish a private communication session.

It is contemplated that the application software executing on the server may be configured to send the message to the recipient or the message may be sent by the recipient device. In the case of the application software executing on the server being the entity that sends the message, the sender would upload (in encrypted format) the message and recipient address to the application software executing on the server and the server application software would generate the complex link and then send the complex link to the intended recipient at the address or telephone number provided by the sender. This method of sending the message has the benefit that the message can be sent anonymously but the application software would incur the cost of sending each message, which is a drawback to this method of operation. It is also possible for the application software executing on the server to send the complex link back to the sender (to the sender's device) and the sender's device will send the message containing the complex link to the intended recipient so the recipient can access the message stored at the application server. This method of operation allows the recipient to see the number of the sender, which could reveal the identity of the sender, but establishes the cost of sending the message, such as an SMS, with the message sender and not the application software executing on the server.

In one configuration, the applicant software executing on the server may be configured to send the message, thereby incurring the costs, but one or more advertisements may be associated with the message, thereby offsetting the cost of the message with ad revenue. In one embodiment the user must click on the ad or view the ad for a predetermined amount of time before the message is viewable. The ad may also be presented during the middle of the message. The ad could also be presented to the sender before the sender can send the message. Given the direct benefit to the sender, the sender may be required to interact with the ad prior to sending the message. In another embodiment, the original sender must view and/or interact with an advertisement such as a banner ad before they may view the reply sent back to their device from the original message recipient. In one embodiment, the content or subject matter of the ad is related to the messages or the user, or information on the user's device.

In one embodiment, the message is sent from the sender to the application software over an encrypted and secure connection. Likewise, the complex link to the message that is sent back from the application software may also be encrypted and secure. The server may store the message, or may delete it immediately after the message is retrieved or after a predetermined amount of time. This prevents the application server from being improperly accessed and secure messages obtained.

Also contemplated for use with the method and apparatus disclosed herein are self-destructing messages, which after fixed or user controllable time limit (10 minutes etc.) are no longer available to the recipient or stored on the server. Such a system would include a timer or time stamp associated with the message and a message life span setting whereby once the message is sent, the time or life span begins running After the time is up, the message self-deletes.

In another embodiment, the system may change or edit the message after the time or life-span of the message is expired. This may occur after the recipient reads or replies to the message, or after a predetermined time since sending. The changed or edited message may be a second message that is a predetermined message entered by the user or stored in the system. In this manner, two messages may be created, where the second message may be a decoy or fake message. The first message is thus only visible for a set period of time, and when the first message expires, either viewed or unviewed, the second message is shown as a decoy in its place.

To provide added convenience to a user, the message or part of the message may be viewed initially in real time, and then displayed a predetermined number of additional times thereafter based on input from the user. For example, a first part of the message may be displayed in real time upon clicking the complex link. After a set period of time, the first part of the message may be overwritten on the receiving person's device. In the event that the receiving person did not have adequate time to view the message, the receiving person may select an option to view the part of the message again.

Figure 7:
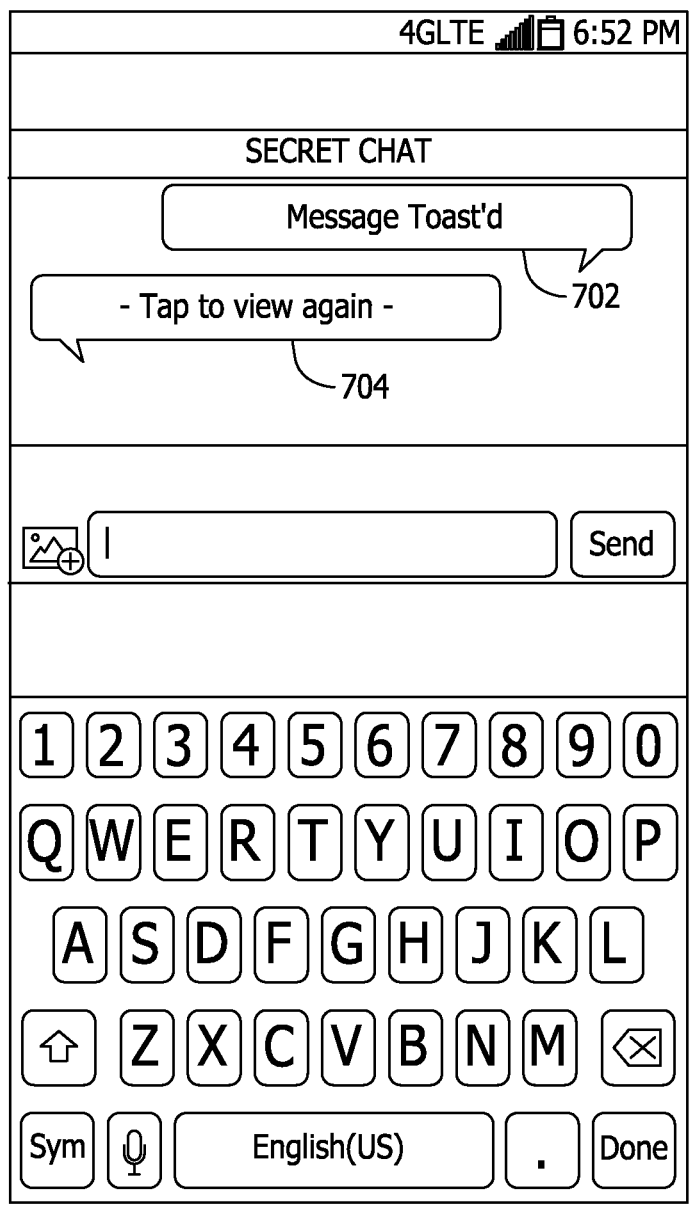
FIG. 7 illustrates an exemplary screen shot of a display providing a user an ability to view a message again.

FIG. 7 illustrates an exemplary screen shot of a display providing a user an ability to view a message again. As shown near the middle of the screen, the user may tap or otherwise activate the screen area 704 which reads "Tap to view again" after the message has been displayed and is no longer on the screen (indicated by the message was "Toast'd" in area 702). The message or portion of the message may again be retrieved from the server and displayed on the recipient's device.

Once the predetermined number of times to view the message have been used, then the message is overwritten on the device or the message is no longer retrievable from the server, and the option to view the message again is not provided. In this way, the recipient may parse through the pieces of the message both in real time while ensuring that the recipient does not miss a part of the message. In one embodiment, the message sender or system sets a time window to view the message a second time or additional times, after which the message is no longer retrievable. This allows the recipient of the message to view the message multiple times within the re-view window, but after the window expires, such as 30 seconds, 1 minute, or an hour, the message may not be re-downloaded or review viewed. This allows the recipient sufficient time to view the message again, but still prevents unauthorized viewing after the window closes or after the message expires when re-viewing is no longer possible.

In another embodiment, a code is required to review the message. The code may come from the sender or be part of the original message. In another embodiment, the code may be an answer to question that the sender believes only the recipient would know and the recipient could type-in to gain access to the message. The code could also be a pre-agreed to term or phrase.

The user may also control how many time the message rotates around on the page, or is scrolled on the screen. In a default configuration the message is displayed two times. Likewise, the sender may limit or adjust the number of times a message is viewable from the complex link. In one embodiment the complex link is only clickable or selectable once to view the message while in other configurations the message link may be clickable any number of predetermined times to view the message. In another embodiment the message parts may be shown in succession more than one time so that the recipient can memorize the contents of the message. The number of times the parts of the message will be shown in succession may be set automatically by the system or adjusted manually by the sender. In one embodiment the message viewing or delivery capability is limited to a particular IP address or range of IP addresses.

The system may also be configured to work with one or more Twitter features. The user may send a Twitter message containing the complex link such that the first 100 people to open the message receive a coupon. Then after the first 100 views, the link in the message expires. The text that is shown after it expires or has already been viewed should be customizable in the app by each user, such as to provide advertising or other promotions and animations could be chosen to vary by the number of views. It is also contemplated that the server software or user device application may be configured to mix in ads with the words of the message as it flashes, or in between the number of times it rotates, scrolls, or is displayed. In some embodiments the user may choose the ad that they want to see, such as for products of interest, or they (sender or recipient) could pay to avoid seeing the ads.

It is also possible and considered to have the recipient type the address, such as telephone number, name, or email of the sender (or any other non-automatable entry) to ensure no one is just hitting random links and seeing messages. It is also contemplated to take a picture of the recipient's face with a camera and show the sender who opened the message. In another embodiment, the sender may upload a photo of the recipient, and the system may then use facial recognition to compare the face of the recipient and the photo against each other for ultimate security.

The reply feature is also unique because it allows the recipient to send a reply back to an anonymous sender that is both encrypted and secure but the recipient does not have to download and install an additional application to do so. By replying to an anonymous sender, the reply is also more secure. In addition, the message that is replied back to the sender may be transmitted through the application server using the application software such that the server may then generate a complex link which is used to access the reply. As a result, in one embodiment the system is configured to have both parties communicating by accessing complex links which establish messages as separated into portions, which are separately downloadable according to the method described above.

In another embodiment the original message could contain a "request to chat" and the reply from the original recipient could result in a complex link being sent to the original sender's device. The original sender would click or tap that link and would have access to an encrypted chat feature on that browser page. This results in the two parties chatting anonymously on an encrypted page.

As an advantage to the messaging system described herein, only one party need have the messaging software loaded on their phone, although both could load or install the software. This allows secure and private communication when only one party installs the software and initiates the communication. This is a benefit of prior art attempts which require both parties to have encryption software so that complicated decryption keys may be exchanged and used for message processing. This uses the SSL between the browser and the server as the encryption. In addition, it is contemplated both parties, namely the sender and recipient, may both use the web based interface to enter messages and either enter a confidential message exchange or send complex links which the other party may access to view the message, the messages delivered with limited viewing periods as discussed above.

In another embodiment, the system is configured such that when a sender sends a message, such as an email, in the actual email is just a code that displays a large image (such as a gif of jpg format image) that is stored on a server. Thus, the email content is actually stored on the server until the recipient reads the email. Then the image is created in real time using the stored text and is sent to the email recipient. Then the image, which includes the words, is viewable. This provides the benefit that when a sender sends an email to a recipient, but the sender wants to change the message, the sender can edit the text of the message stored on the server up until the recipient reads it. This process could also work in the browser for texts such that the message can be edited until retrieved and read by the message recipient. It is also contemplated that the image could be or contain a link and the link in the image could be one link of multiple hyperlinks. For example, the image containing the link may link to an online version of the message.

In another embodiment, the system is configured to work for sending image files between devices in a similar manner. In this embodiment, an image or part of an image on a sender device is blurred or otherwise corrupted using the application on the sender's device. The blurred image is then sent to the server. The recipient, by clicking on a complex link, may view the image on his or her device similar to how a message is viewed on the device. Based on settings by the sender, the image may or may not be processed to undo the blurring or the corruption. After a predetermined amount of time the image is overwritten on the recipient's device, or the browser that the recipient uses is configured so as not to cache the viewed image. In such an embodiment, the nature of the image is never revealed when traveling to the server or between the sender and recipient.

When only a part of the image is blurred, the user's application may use face detection to blur faces in the image, or other image features. Further, the application may optionally allow the user to choose to blur faces or other selected areas of the image, in every image, to ask whether the faces should be blurred, or to never blur faces when faces are detected. The user may also select a blur amount to adjust the amount of blur on the faces. The application may be configured to blur the faces or other selected area using a predetermined reversible method. In this manner, the user may provide a code to the recipient which would allow the recipient to un-blur the image by running the method in reverse, returning the image to its original condition. In this manner, no server ever has the un-blurred image. In one configuration, when only a selected portion of the image is blurred or corrupted, the sender may determine whether or not the recipient may un-blur or uncorrupt the selected area. Thus, while the entire image may be blurred or corrupted when traveling over the network or to the server, in on embodiment, the entire image is not un-blurred, but instead only a portion of the image is un-blurred at the recipient device.

Figure 8:
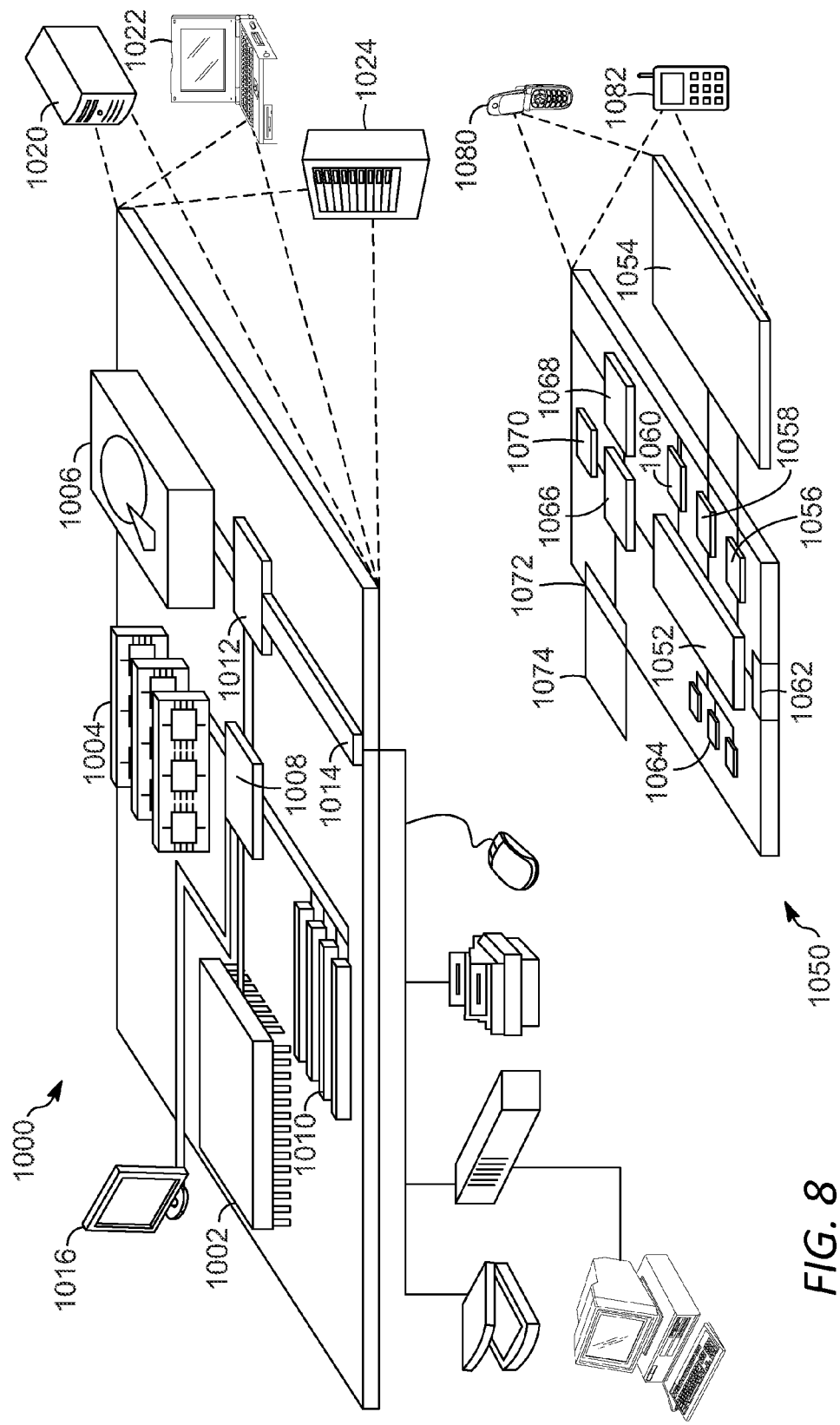
FIG. 8 is a block diagram of an exemplary server system and mobile device.

FIG. 8 is a block diagram showing example or representative computing devices and associated elements that may be used to implement the functionality described herein. FIG. 8 shows an example of a generic computing device 1000 and a generic mobile computing device 1050, which may be used with the techniques described here. Computing device 1000 is intended to represent various forms of digital computers, such as server laptops, desktops, workstations, servers, blade databases, mainframes, and other appropriate computers. Computing device 1050 is intended to represent various forms of mobile devices, such as personal digital assistants, tablets, camera equipped glasses, user wearable cameras or computing devices, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface or controller 1008 connecting to memory 1004 and high-speed expansion ports 1010, and a low-speed interface or controller 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed controller 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed bus 1014. The low-speed bus 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 550. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on the processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wife, or other such transceiver (not shown). In addition, GPS (Global Positioning system) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, a computer tablet, or other similar mobile device. The computing device 1050, which may be referred to as a mobile device, is also equipped with one or more cameras.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 1000 and/or 1050) that includes a back end component (e.g., as a data server), or that includes a middleware component (e.g., an application server), or that includes a front end component (e.g., a client computer or a mobile device having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include mobile devices and servers. A mobile device and server are generally remote from each other and typically interact through a communication network. The relationship of mobile device and server arises by virtue of computer programs running on the respective computers and having a mobile device-server relationship to each other.

In the example embodiment, computing devices 1000 and 1050 are configured to receive and/or retrieve electronic documents from various other computing devices connected to computing devices 1000 and 1050 through a communication network, and store these electronic documents within at least one of memory 1004, storage device 1006, and memory 1064. Computing devices 1000 and 1050 are further configured to manage and organize these electronic documents within at least one of memory 1004, storage device 1006, and memory 1064 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components (including, among other things, engines, layers, and applications), capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. One or more processors may be programmed or configured to execute any of the computer-executable instructions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for sending a secure message from a first electronic computing device to a second electronic computing device, the method comprising:

receiving at a message server encrypted input that was entered via an input device of the first computing device and encrypted by the first computing device, the input including address information of the second computing device and contents of the secure message to be sent to the second computing device;

processing with a processor executing machine readable code, at the message server, the secure message contents to unencrypt the secure message contents and separate the secure message contents into at least a first message part and a second message part, the first message part and a second message part established as first downloadable content and second downloadable content;

generating a complex link at the message server, the complex link associated with the secure message content;

sending the complex link to the second computing device;

responsive to the complex link being selected by a user of the second computing device, transmitting from the message server the first downloadable content of the separately downloadable content to the second computing device, the first downloadable content comprising the first message part;

after transmitting the first downloadable content, transmitting from the message server the second downloadable content to the second computing device, the second downloadable content comprising the second message part and the second downloadable content is configured to overwrite the first downloadable content on the second computing device; and transmitting via the message server a blank downloadable content or content other than content from the secure message after transmitting a last downloadable content, the blank downloadable content or content other than content from the secure message overwrites the last downloadable content.

2. The method according to claim 1, wherein the message server transmits the complex link to the first computing device instead of the second computing device, and the first computing device then transmits the complex link to the second computing device.

3. The method according to claim 1, wherein the complex link directs the second computing device to open a secure window of a web browser on the second computing device, and the first and second downloadable content are downloaded via the web browser.

4. The method according to claim 3, further comprising presenting the user of the second computing device an option to initiate a secure chat in the secure window of the web browser to respond to the secure message.

5. A system for sending secure messages, the system comprising:

a processor, one or more transceivers configured to send and receive information through one or more networks, and one or more memories including a non-transitory, computer readable storage medium, the one or more memories storing machine readable instructions, which when executed by the processor, perform the following steps:

receive message input, from the one or more transceivers, the message input including address information of a message recipient and contents of a message to be sent to the message recipient;

process the message input to separate the contents of the message into at least a first message part and a second message part, the first message part established as first downloadable content and the second message part established as second downloadable content;

generate a link, the link associated with the message input;

send the link to the message recipient using the one or more transceivers;

responsive to receiving a request for the contents of the message by the message recipient using the link, transmit, using the one or more transceivers, the first downloadable content to the message recipient, the first downloadable content including the first message part;

after transmitting the first downloadable content, transmit the second downloadable content to the message recipient, the second downloadable content including the second message part; wherein the second downloadable content is configured to overwrite the first downloadable content; and transmitting a blank downloadable content or content other than content from the message input after transmitting a last downloadable content, the blank downloadable content or content other than content from the message input overwriting the last downloadable content.

6. The system according to claim 5, wherein the system transmits the second downloadable message content to the message recipient at a predetermined time after transmitting the first downloadable message content.

7. The system according to claim 5, wherein the system stores the message input for a predetermined time period and then deletes the message input from the system.

8. The system according to claim 5, wherein the system stores the message input until accessed by the message recipient.

9. The system according to claim 5, wherein the system is configured to host a secure chat.

10. The system according to claim 5, wherein the message content is or includes and image file.

11. The system according to claim 10, wherein the system configures a width of the image file to be greater than a resolution width of a screen so that only a portion of an image stored in the image file is viewable on the screen.

12. The system according to claim 5, wherein the link includes a random numeric code that is unique to the link.

13. A non-transitory computer-readable medium including computer readable code that, when executed, causes an apparatus to:

receive a private message from a first electronic device, the private message including message content and a second device address, the second device address associated with a second electronic device;

process the private message to separate the message content into at least a first message part and a second message part;

transmit the first message part to the second device using the second device address;

after a period of time, send the second message part to the second electronic device using the second device address, wherein the sending of the second message part overwrites or delete the first message part on the second electronic device; and after a period of time, overwriting a last message part with blank content or content from other than the private message.

14. The non-transitory computer-readable medium of claim 13, wherein the computer-readable medium is a memory and the instructions are software code.

15. The non-transitory computer-readable medium of claim 13, wherein the private message is encrypted when received and the non-transitory code is further configured to decrypt the private message after receipt.

16. The non-transitory computer-readable medium of claim 13, wherein computer-readable medium is configured to send a link to the second electronic device prior to sending the first message part, the link, when accessed by the second electronic device, sending a request from the second electronic device to the computer-readable medium to send the first message part and then the second message part.

17. The non-transitory computer-readable medium of claim 16, wherein the link is active for a set period of time, after which the link is inactive.

18. The non-transitory computer-readable medium of claim 13, further comprising computer readable code configured to initiate a web based chat session between the first electronic device and the second electronic device.

* * * * *